United States Patent
Jia et al.

(10) Patent No.: US 10,149,029 B2
(45) Date of Patent: Dec. 4, 2018

(54) LOUDSPEAKER MODULE APPLIED INSIDE TERMINAL

(71) Applicant: GOERTEK INC., WeiFang (CN)

(72) Inventors: Wei Jia, WeiFang (CN); Hua Shi, WeiFang (CN)

(73) Assignee: GOERTEK INC., WeiFang (CN)

( * ) Notice: Subject to any disclaimer, the term of this patent is extended or adjusted under 35 U.S.C. 154(b) by 0 days.

(21) Appl. No.: 15/670,678

(22) Filed: Aug. 7, 2017

(65) Prior Publication Data

US 2017/0339476 A1 Nov. 23, 2017

Related U.S. Application Data

(63) Continuation of application No. 15/306,987, filed as application No. PCT/CN2015/075120 on Mar. 26, 2015, now Pat. No. 9,961,423.

(30) Foreign Application Priority Data

Apr. 29, 2014 (CN) .......................... 2014 1 0179404

(51) Int. Cl.
*H04R 1/02* (2006.01)
*H04R 1/28* (2006.01)
(Continued)

(52) U.S. Cl.
CPC ............ *H04R 1/025* (2013.01); *H04M 1/026* (2013.01); *H04M 1/035* (2013.01);
(Continued)

(58) Field of Classification Search
None
See application file for complete search history.

(56) References Cited

U.S. PATENT DOCUMENTS

| | | | |
|---|---|---|---|
| 2004/0253995 A1* | 12/2004 | Matsumoto | H04M 1/03 455/569.1 |
| 2007/0049326 A1* | 3/2007 | Kim | H01Q 1/243 455/550.1 |

(Continued)

FOREIGN PATENT DOCUMENTS

| | | |
|---|---|---|
| CN | 1674716 A | 9/2005 |
| CN | 102347998 A | 2/2012 |

(Continued)

OTHER PUBLICATIONS

Office Action from Korean Patent Office for Application No. 10-2016-7024248 dated Sep. 14, 2017.
(Continued)

*Primary Examiner* — Thomas H Maung
*Assistant Examiner* — Qin Zhu

(57) ABSTRACT

Disclosed is a loudspeaker module applied inside a terminal, wherein, the terminal comprises a terminal housing, and the loudspeaker module is fixed inside the terminal. The loudspeaker module comprises a loudspeaker unit and a module housing for accommodating and fixing the loudspeaker unit. A closed space formed by the loudspeaker unit, an outer wall of the module housing, and the terminal housing is a rear sound cavity. By means of the loudspeaker module provided in the present invention, the usable space inside the terminal can be converted into the rear sound cavity, so that the space of the rear sound cavity is enlarged, and the acoustic performance of the loudspeaker module can be effectively improved. Therefore, the present invention makes full use of the inside space of the terminal to realize the thinning of the loudspeaker module without changing the inside space of the terminal, and achieves good acoustic performance.

16 Claims, 6 Drawing Sheets

(51) Int. Cl.
H04M 1/03 (2006.01)
H04M 1/60 (2006.01)
H04M 1/02 (2006.01)

(52) U.S. Cl.
CPC ............ H04M 1/6041 (2013.01); H04R 1/02 (2013.01); H04R 1/2811 (2013.01); H04R 2499/11 (2013.01)

(56) References Cited

U.S. PATENT DOCUMENTS

| | | | | |
|---|---|---|---|---|
| 2007/0081691 | A1* | 4/2007 | Park | H04M 1/03 381/386 |
| 2008/0268793 | A1* | 10/2008 | Nelson | H04M 1/0262 455/90.3 |
| 2009/0291718 | A1* | 11/2009 | Fukazawa | H04M 1/03 455/575.1 |
| 2010/0322456 | A1* | 12/2010 | Park | H04M 1/035 381/387 |
| 2010/0331058 | A1* | 12/2010 | Qingshan | H04M 1/035 455/575.1 |
| 2011/0064251 | A1* | 3/2011 | Siotis | H04R 1/2834 381/191 |
| 2012/0237076 | A1* | 9/2012 | Kuze | H04R 7/20 381/387 |
| 2014/0153769 | A1 | 6/2014 | Chen et al. | |
| 2014/0177902 | A1* | 6/2014 | Yeh | H04R 1/227 381/394 |
| 2014/0369546 | A1* | 12/2014 | Huang | H04R 1/2834 381/395 |

FOREIGN PATENT DOCUMENTS

| | | |
|---|---|---|
| CN | 202634636 U | 12/2012 |
| CN | 103747398 A | 4/2014 |
| CN | 103957486 A | 7/2014 |
| CN | 203840489 U | 9/2014 |
| JP | 2003-169119 A | 6/2003 |
| WO | WO 2013/106369 A1 | 7/2013 |

OTHER PUBLICATIONS

International Search Report for International Patent Application No. PCT/CN2015/075120 filed on Mar. 26, 2015.
Office Action from Chinese Patent Office for Application No. 201410179404.1, dated Nov. 7, 2016.
Office Action from Chinese Patent Office for Application No. 201410179404.1, dated May 31, 2017.

* cited by examiner

US 10,149,029 B2

LOUDSPEAKER MODULE APPLIED INSIDE TERMINAL

CROSS-REFERENCE TO RELATED APPLICATIONS

The present specification is a continuation of U.S. patent application Ser. No. 15/306,987 filed Oct. 26, 2016, which is a U.S. National Stage of International Patent Application No. PCT/CN2015/075120 filed Mar. 26, 2015, which claims priority to and the benefit of Chinese Patent Application No. 201410179404.1, filed on Apr. 29, 2014, the entire contents of which are incorporated herein by reference.

TECHNICAL FIELD

The present invention relates to the technical field of loudspeaker, more specifically, to a loudspeaker module applied inside a terminal.

BACKGROUND ART

As the progress of society and the rapid development of science and technology, portable electronic products, such as, cellphones and ipads, etc., are rising gradually, and become popular due to convenience to carry and comprehensive functionalities, which satisfy people's various requirements, such as, surfing the Internet, communication, and entertainment, etc. As important acoustic components in portable electronic products, loudspeaker modules are widely used thereupon.

As the improvement of requirements on portable electronic products, the acoustic performance of the loudspeaker module is being paid more and more attention.

As the volume of the portable electronic product is designed to become smaller and smaller, the space left for the loudspeaker module is smaller and smaller. However, in order to ensure good acoustic performance, a cavity with certain dimensions is required to be reserved inside the loudspeaker module, which causes the loudspeaker module to occupy a certain space in the portable electronic product, thereby increasing the volume of the portable electronic product.

Consequently, there is a need for a new technical solution for assembling loudspeaker modules and portable electronic products.

SUMMARY

In view of the above problems, an objective of the present invention is to provide a loudspeaker module applied inside a terminal, so as to resolve the problem that the loudspeaker module occupies a relatively larger space inside the terminal.

The present invention provides a loudspeaker module applied inside a terminal. The terminal comprises a terminal housing, and the loudspeaker module is fixedly mounted on the terminal housing; wherein, the loudspeaker module comprises a loudspeaker unit and a lower module housing for accommodating and fixing the loudspeaker unit; the lower module housing is fixed on the terminal housing, wherein, a rear acoustic cavity is defined as a closed space formed by the loudspeaker unit, an outer wall of the lower module housing, and the terminal housing.

In addition, the present invention provides a loudspeaker module applied inside a terminal. The terminal comprises a terminal housing, and the loudspeaker module is fixedly mounted on the terminal housing; wherein, the loudspeaker module comprises a loudspeaker unit and a module housing for accommodating and fixing the loudspeaker unit;

the module housing comprises an upper module housing, and a rear acoustic cavity is defined as a space formed between the loudspeaker unit and the upper module housing, wherein, a through hole is provided at a predetermined position on the upper module housing, and the rear acoustic cavity is in communication with a space inside the terminal housing via the through hole.

By means of the loudspeaker module applied inside the terminal provided by the present invention, the usable space inside the terminal can be transformed into the rear acoustic cavity, so that the space of the rear acoustic cavity is enlarged, and the acoustic performance of the loudspeaker module can be effectively improved. Therefore, the present invention makes full use of the interior space of the terminal to realize the thinning of the loudspeaker module and achieve good acoustic performance, without changing the interior space of the terminal.

The difference between the present patent and the prior art is that the loudspeaker module with a conventional structure is an independent structure in which the front acoustic cavity and the rear acoustic cavity are separated, the rear acoustic cavity is sealed, and the rear acoustic cavity is a structure inside the space of the loudspeaker module per se. As the existing loudspeaker module is small in size, the volume of the rear acoustic cavity is limited. Thus, in the present invention, the rear acoustic cavity is opened so as to be in communication with the cavity in the terminal, thereby utilizing the cavity in the terminal as the rear acoustic cavity as well, increasing the volume of the rear acoustic cavity, and facilitating improvement in performance. This solution achieves good acoustic performance when the dimension of the module is relatively smaller.

In order to achieve the above and related objectives, one or more aspects of the present invention comprise the features detailed below and indicated particularly in the claims. Some exemplary aspects of the present invention are described in details by the description below and the accompanying drawings. However, these aspects only indicate some implementations of various implementations of the present invention. In addition, the present invention is intended to contain these aspects and the equivalents thereof.

BRIEF DESCRIPTION OF THE DRAWINGS

By referring to the descriptions in connection with the accompanying drawings and the contents of the claims, and with a full understanding of the present invention, other purposes and results of the present invention will be more clearly and easily understand. In the drawings:

Same reference numerals in all of the accompanying drawings indicate similar or corresponding features or functions.

Figure 1:
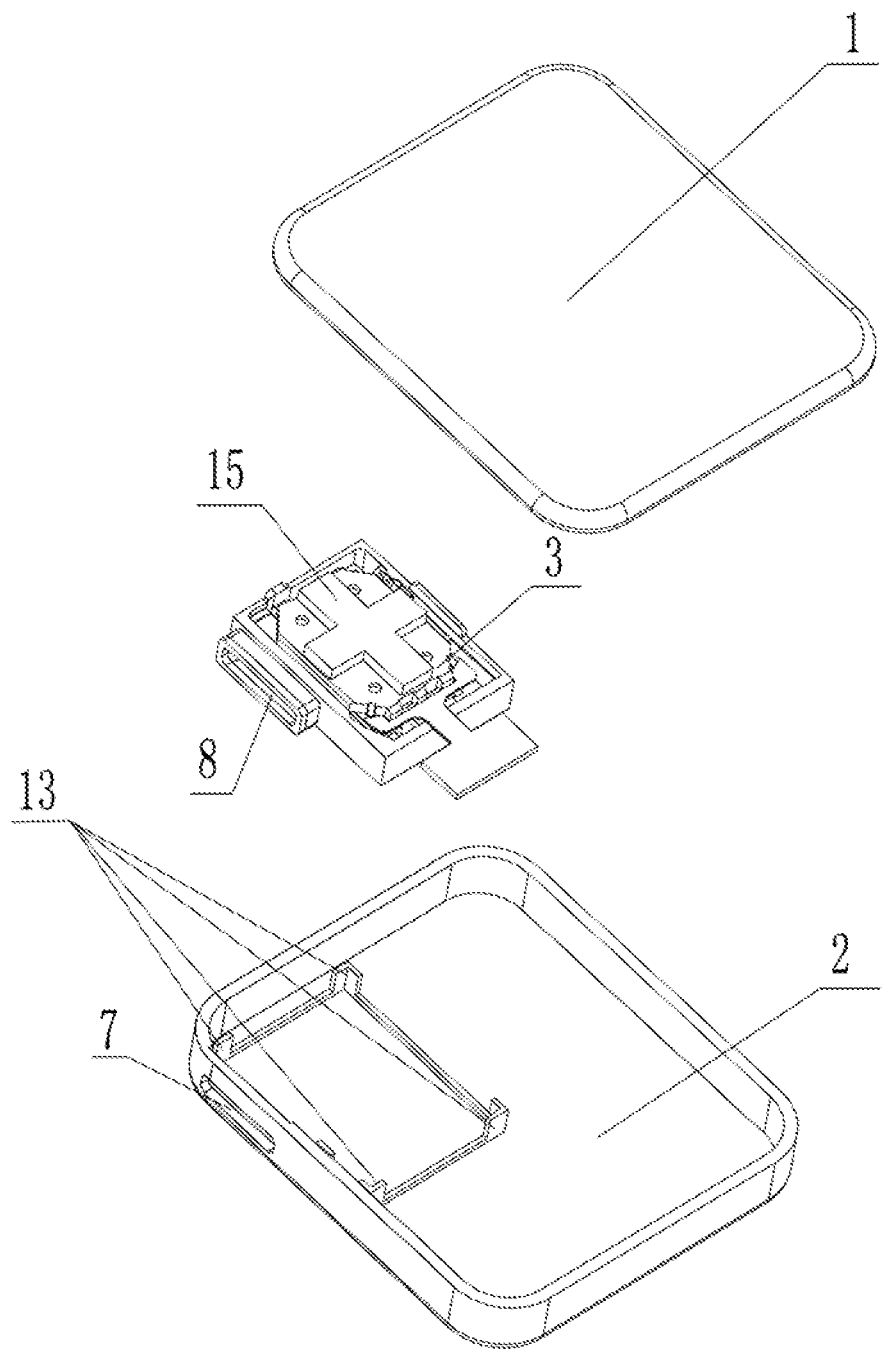
FIG. 1 is an entire structure diagram showing the loudspeaker module applied inside the terminal according to the embodiment I of the present invention.

Wherein, the reference numerals comprises: cellphone back cover 1, cellphone housing 2, loudspeaker module 3, loudspeaker unit 4, lower module housing 5, upper module housing 6, sound hole 7, sound outlet 8, electric connecting part 9, front acoustic cavity 10, rear acoustic cavity 11, sealing element 12, loudspeaker module positioning structure 13, loudspeaker unit positioning structure 14, foam 15, through hole 16.

DETAILED DESCRIPTION OF EMBODIMENTS

Various specific details are set forth in the following description to comprehensively understand one or more embodiments for sake of illustration. However, it is obvious that these embodiments can be implemented without such specific details. In other examples, known structures and devices are illustrated by block diagrams to facilitate describing one or more embodiments.

Hereinafter, particular embodiments of the present invention are described in connection with the accompanying drawings.

The present invention makes full use of the interior space of the terminal to achieve good acoustic performance without changing the interior space of the terminal. Accordingly, the present invention may be applied into a minitype terminal having a loudspeaker function. Hereinafter, a cellphone is taken as an example of the terminal, and two particular embodiments are described to particularly explain the principle of how to improve the acoustic performance of the loudspeaker module using the interior space of the cellphone.

Embodiment I

FIG. 1 is an entire structure diagram showing the loudspeaker module applied inside the terminal according to the embodiment I of the present invention.

As shown in FIG. 1, the present invention provides a loudspeaker module applied inside a terminal, wherein, the terminal comprises a terminal housing, and the loudspeaker module 3 is fixedly mounted on the terminal housing. The loudspeaker module 3 comprises a loudspeaker unit 4 and a lower module housing 5 for accommodating and fixing the loudspeaker unit 4, wherein, a rear acoustic cavity is defined as a closed space formed by the loudspeaker unit 4, an outer wall of the lower module housing 5, and the terminal housing. By taking a cellphone as an example of the terminal, the terminal housing comprises a cellphone housing 2 and a cellphone back cover 1, the cellphone back cover 1 is snap-fitted to the cellphone housing 2, the lower module housing 5 is fixed on the cellphone housing 2, a front acoustic cavity 10 is defined as a closed space formed by the loudspeaker unit 4 and an inner wall of the lower module housing 5, and a rear acoustic cavity 11 is defined as a space formed by an upper surface of the loudspeaker unit 4, the outer wall of the lower module housing 5, the cellphone housing 2, and the cellphone back cover 1.

It should be noted that, the structure of the existing loudspeaker module comprises an upper module housing and a lower module housing, wherein, the upper module housing and the loudspeaker unit form a rear acoustic cavity; the rear acoustic cavity is a structure provided inside the space of the loudspeaker module per se, and thus a certain space inside the cellphone will be occupied when the loudspeaker module is installed inside the cellphone, thereby affecting the overall dimension of the cellphone; meanwhile, the loudspeaker module has a limited space per se, and the volume of the rear acoustic cavity is limited as well. On the other hand, in the loudspeaker module applied inside the terminal provided by the embodiment I of the present invention, the snap-fitted cellphone housing 2 and the cellphone back cover 1 are used as an upper module housing, and a rear acoustic cavity is defined as a space between the upper module housing and the loudspeaker unit, thereby increasing the space of the rear acoustic cavity without changing the interior space of the cellphone.

Additionally, in the loudspeaker module applied inside the terminal provided by the embodiment I of the present invention, the lower module housing 5 accommodating the loudspeaker unit 4 is a hollow groove-shaped lower module housing 5, a sound outlet 8 is provided on a sidewall of the lower module housing 5, and the sound outlet 8 is in communication with the front acoustic cavity 10. A sound hole 7 is provided on a lateral surface of the cellphone housing 2, and the sound hole 7 is fitted to the sound outlet 8 correspondingly. In a particular implementation, the sound outlet 8 protrudes from a surface of the sidewall of the lower module housing 5. During assembly, the sound outlet 8 is inserted into the sound hole 7 on the cellphone housing 2, so as to conduct the acoustic signal converted by the loudspeaker unit 4 to the outside, together with the sound hole 7. The sound outlet 8 may be integratedly formed with the lower module housing 5, or may be jointed with the lower module housing 5 after molding respectively.

In order to accurately fix the loudspeaker unit 4 on the lower module housing 5, in a preferred implementation of the embodiment I of the present invention, loudspeaker unit positioning structures 14 are provided on three sidewalls (excluding the sidewall provided with the sound outlet) of the lower module housing 5, and the loudspeaker unit 4 may be rapidly and effectively fixed on the lower module housing 5 through the loudspeaker unit positioning structures 14. The loudspeaker unit positioning structures 14 may be provided in the form of snap joints, projections or the like, and the loudspeaker unit positioning structures 14 may be integratedly formed with the lower module housing 5, or may be jointed with the lower module housing 5 after molding respectively.

Likewise, in order to accurately fix the loudspeaker module 3 on the cellphone housing 2, in a preferred implementation of the embodiment I of the present invention, loudspeaker module positioning structures 13 for fixing the loudspeaker module 3 are provided on the cellphone housing 2, and the loudspeaker module 3 may be rapidly and effectively fixed on the cellphone housing 2 through the loudspeaker module positioning structures 13. The loudspeaker module positioning structures 13 may be provided in the form of snap joints, projections or the like, and the loudspeaker module positioning structures 13 may be integratedly formed with the cellphone housing, or may be fixed on the cellphone housing 2 by adhesive or other methods after molding respectively.

During the assembly of the loudspeaker module 3 and the cellphone, the loudspeaker unit 4 is installed on the loudspeaker module 3 first, then the assembled loudspeaker module 3 is installed in the cellphone housing 2, and finally the cellphone back cover 1 is snap-fitted to the cellphone housing. In order to avoid the upper surface of the loudspeaker unit 4 bumping against the cellphone back cover 1, in a particular implementation, a foam 15 is adhered above the loudspeaker unit 4. When the cellphone back cover 1 is snap-fitted to the cellphone housing 2, the foam 15 is press-fitted between the cellphone back cover 1 and the loudspeaker unit 4 to play a role of buffering and sealing for the loudspeaker unit 4. Certainly, the foam 15 may be directly adhered on the cellphone housing 2 at a position opposite to an assembly position of the loudspeaker unit 4, according to practical design and assembly requirements.

In the embodiment I of the present invention, an electric connecting part 9 is connected to a border position at one side of the loudspeaker module 3, and located at the upper side of the lower module housing, so as to supply electric signals to the loudspeaker module 3 and drive the loudspeaker module 3 to produce sound.

Figure 2:
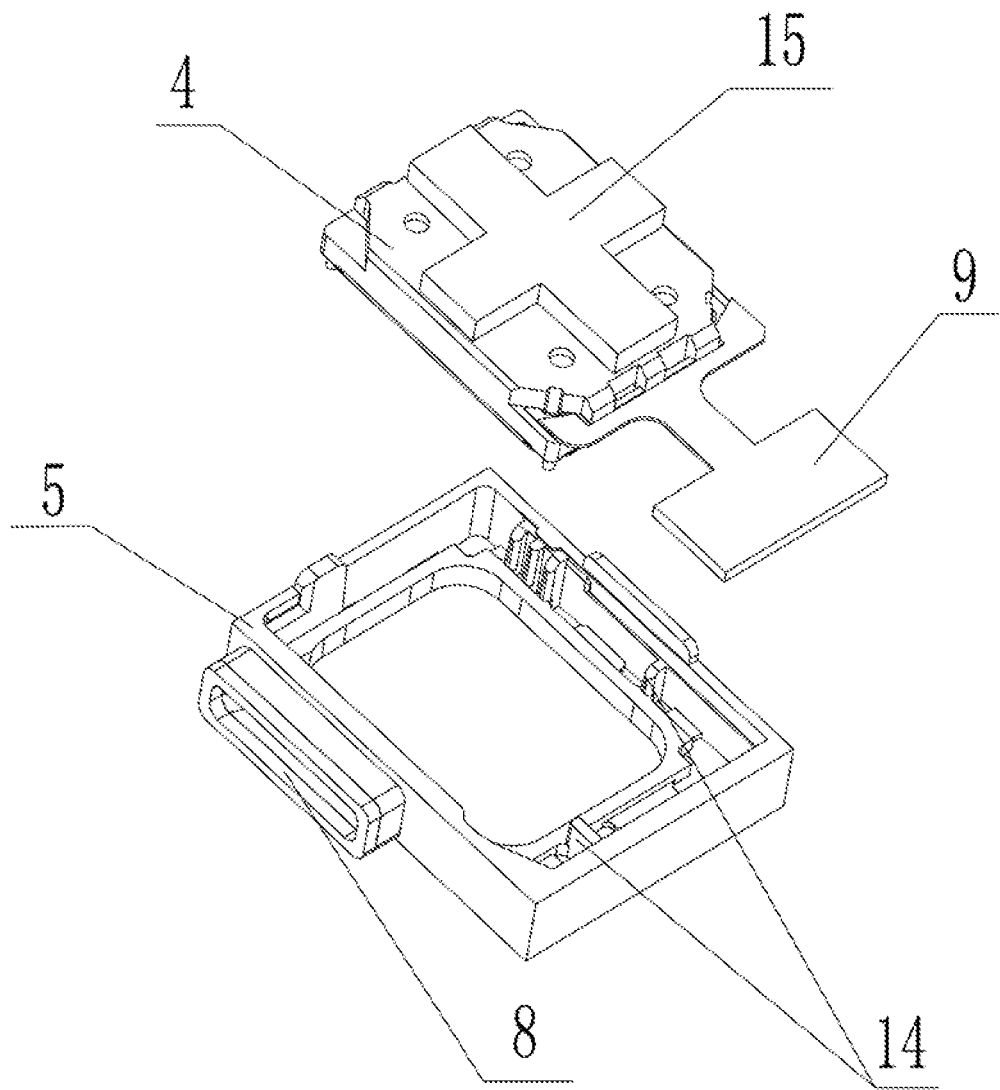
FIG. 2 is a structure diagram showing the loudspeaker module according to the embodiment I of the present invention.

FIG. 2 is a structure diagram showing the loudspeaker module according to the embodiment I of the present invention.

As shown in FIG. 2, the center portion of the bottom of the lower module housing 5 of the loudspeaker module 3 is hollow, and an upward flange is provided at the border position of the hollow portion, so that the loudspeaker unit 4 cannot be adhered to the bottom of the lower module housing 5. A front acoustic cavity 10 is defined as a space formed between the bottom of the lower module housing 5 and the loudspeaker unit 4.

Figure 3:
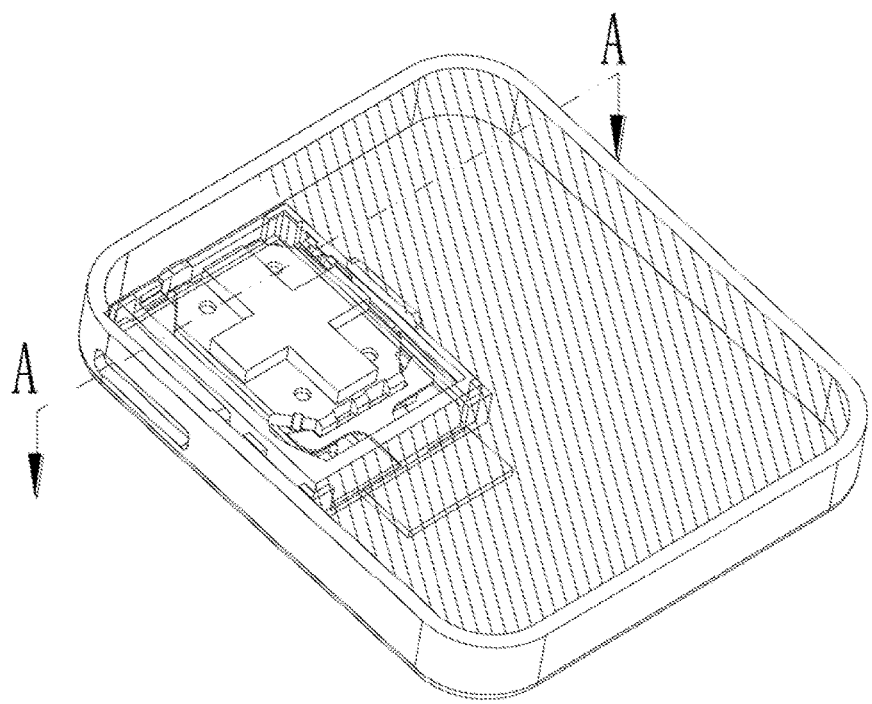
FIG. 3 is an assembly schematic diagram showing the loudspeaker module applied inside the terminal according to the embodiment I of the present invention.
Figure 4:
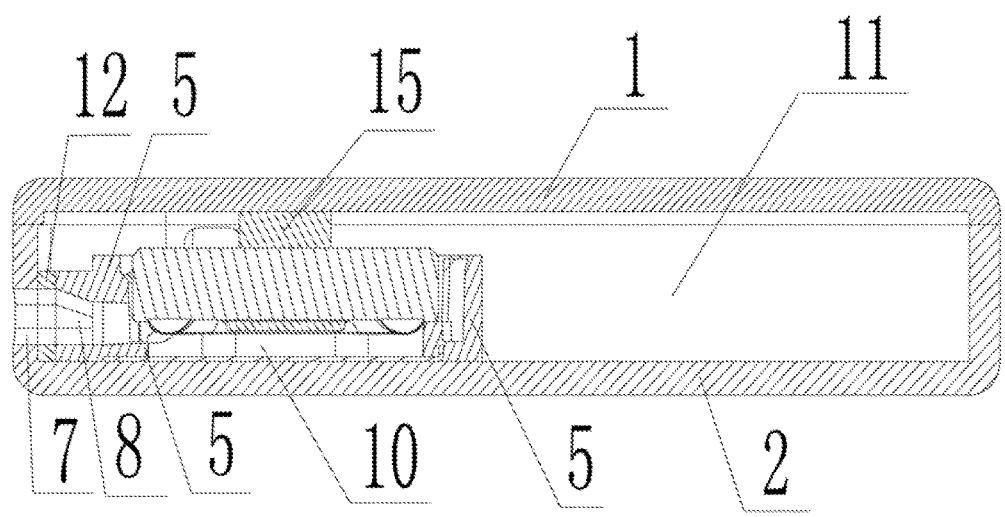
FIG. 4 is a section view taken along line A-A in FIG. 3.

FIG. 3 is an assembly schematic diagram showing the loudspeaker module applied inside the terminal according to the embodiment I of the present invention, and FIG. 4 is a section view taken along line A-A in FIG. 3.

As shown in FIG. 3 and FIG. 4, in order to illustrate the connection structure of the loudspeaker module and the cellphone more visually, FIG. 3 is an assembly schematic diagram in which the cellphone back cover 1 is not yet snap-fitted. As can be seen in connection with FIG. 4, a front acoustic cavity 10 is defined as a space formed by the loudspeaker unit 4 and the lower module housing 5, the front acoustic cavity 10 is in communication with the sound outlet 8 of the lower module housing 5, and a rear acoustic cavity 11 is defined as a space formed by the loudspeaker unit 4, the rear module housing 5, the cellphone housing 2 and the cellphone back cover 1. The dash area in FIG. 3 indicates the rear acoustic cavity 11, and other components inside the cellphone housing are not illustrated. As the loudspeaker unit 4 does not contact with the cellphone back cover 1, the space between the cellphone back cover 1 and the loudspeaker unit 4 is the rear acoustic cavity as well.

As the rear acoustic cavity of the loudspeaker module 3 is required to be sealed, a sealing element 12 is provided at a position where the sound outlet 8 of the lower module housing 5 and the front acoustic cavity 10 are connected with each other, the sealing element 12 is entangled around the sound outlet 8 so as to seal the front acoustic cavity and the rear acoustic cavity, and separate the front acoustic cavity 10 and the rear acoustic cavity 11. The sealing element 12 may be a sealing elastic cushion, a rubber ring or other sealing device.

The loudspeaker module applied inside the terminal according to the embodiment I of the present invention is described above. As can be seen, because the larger the volume of the rear acoustic cavity, the better the bass effect, the loudspeaker module provided by the embodiment I of the present invention makes full use of the space inside the terminal, so as to maximize the volume of the rear acoustic cavity to achieve good acoustic performance of the terminal.

Embodiment II

The embodiment II provides another loudspeaker module applied inside a terminal, the rear acoustic cavity of the loudspeaker module is in communication with the space inside the terminal from a lateral surface.

Figure 5:
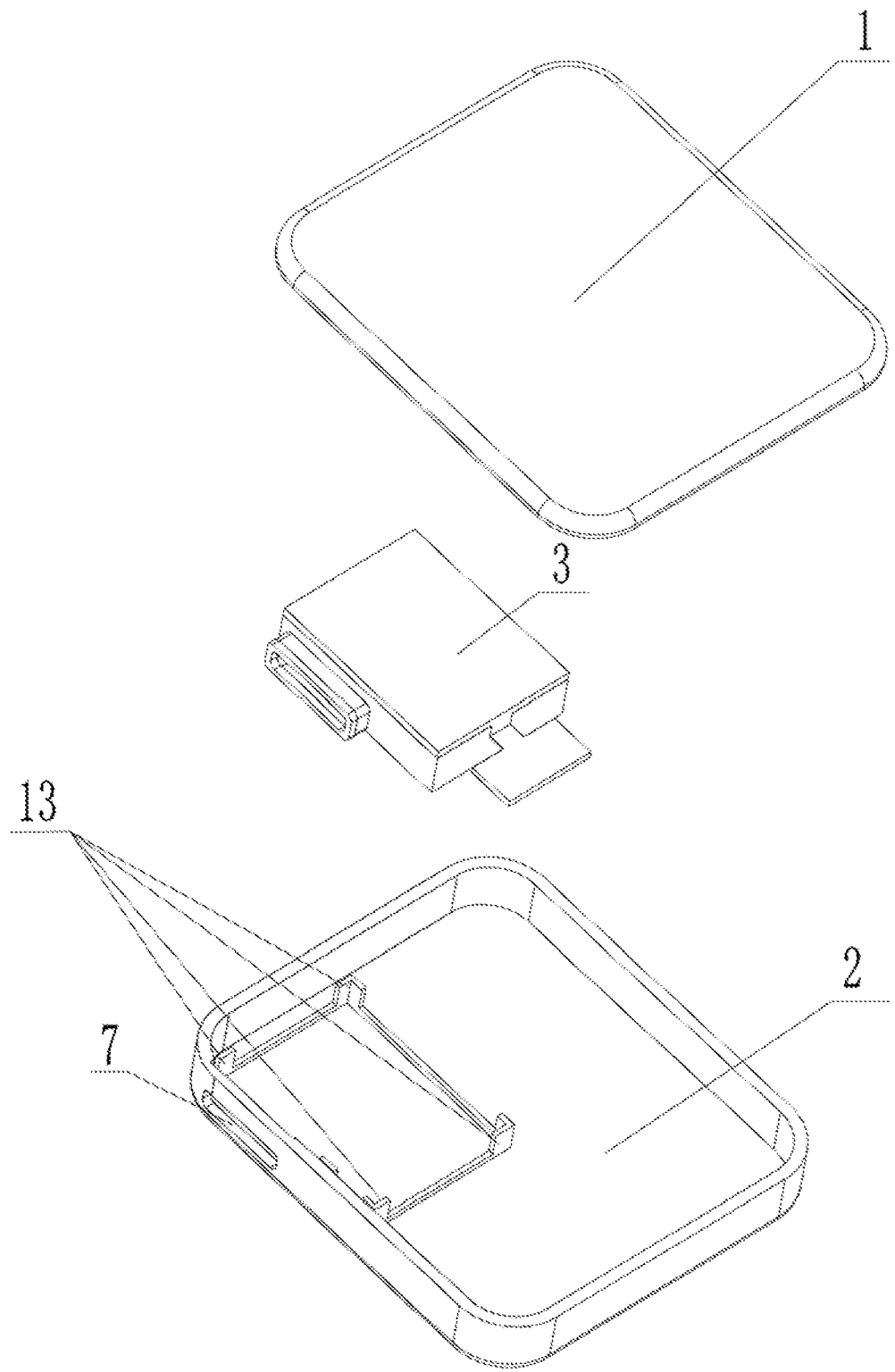
FIG. 5 is an entire structure diagram showing the loudspeaker module applied inside the terminal according to the embodiment II of the present invention.
Figure 6:
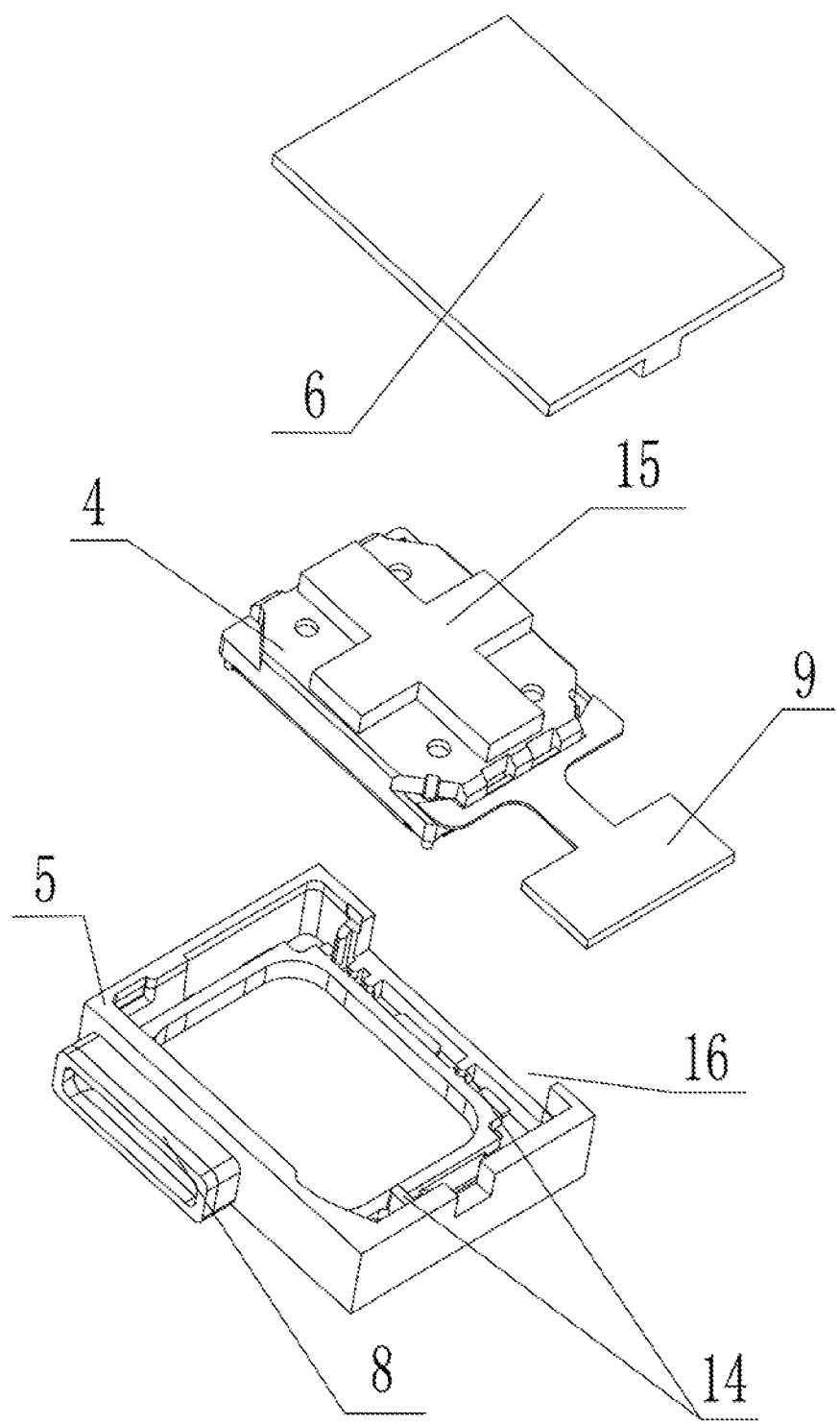
FIG. 6 is a structure diagram showing the loudspeaker module according to the embodiment II of the present invention.

FIG. 5 and FIG. 6 are an entire structure diagram showing the loudspeaker module applied inside the terminal and a structure diagram showing the loudspeaker module according to the embodiment II of the present invention, respectively.

As shown in FIG. 5 and FIG. 6, the embodiment II provides a loudspeaker module applied inside a terminal. Likewise, the terminal comprises a terminal housing, and the loudspeaker module 3 is fixedly mounted on the terminal housing. The loudspeaker module 3 comprises a loudspeaker unit 4 and a module housing for accommodating and fixing the loudspeaker unit 4, and the module housing comprises an upper module housing 6 and a lower module housing 5. By taking a cellphone as an example of the terminal, the terminal housing comprises a cellphone housing 2 and a cellphone back cover 1, the cellphone back cover 1 is snap-fitted to the cellphone housing 2, the lower module housing 5 is fixed on the cellphone housing 2, a front acoustic cavity 10 is defined as a space formed between the loudspeaker unit 4 and the lower module housing 5, and a rear acoustic cavity 11 is defined as a space formed between the loudspeaker unit 4 and the upper module housing 6. A through hole 16 is provided at a predetermined position on the upper module housing 6, and the rear acoustic cavity 11 is in communication with the space inside the cellphone (a space formed inside the cellphone when the cellphone housing 2 is snap-fitted to the cellphone back cover 1) through the through hole 16.

Compared with the embodiment I, in the embodiment II, the loudspeaker module is installed inside the cellphone without removing the upper module housing. By providing a through hole in the sidewall of the lower module housing 5, the rear acoustic cavity 11 is in communication with the space inside the cellphone, and the space available inside the cellphone is changed into the rear acoustic cavity so as to increase the volume of the rear acoustic cavity 11, and improve the acoustic performance of the loudspeaker module 3. Thus, the loudspeaker module provided by the embodiment II is more suitable for the condition when there is not enough space in the vertical direction of the cellphone (i.e., the thickness of the cellphone is relatively thinner).

In another aspect, the module housing accommodating the loudspeaker unit 4 comprises a hollow groove-shaped lower module housing 5 and an upper module housing 6, wherein, a sound outlet 8 is provided on a sidewall of the lower module housing 5, and the sound outlet 8 is in communication with the front acoustic cavity 10; a sound hole 7 is provided in a lateral surface of the cellphone housing 2, and the sound hole 7 is fitted to the sound outlet 8 correspondingly. In a particular implementation, the sound outlet 8 protrudes from a surface of the sidewall of the lower module housing 5. During assembly, the sound outlet 8 is inserted into the sound hole 7 on the cellphone housing 2, so as to conduct the acoustic signal converted by the loudspeaker unit 4 to the outside, together with the sound hole 7. The sound outlet 8 may be integratedly formed with the lower module housing 5, or may be jointed with the lower module housing 5 after molding respectively.

After the loudspeaker unit 4 is installed in the lower module housing 5, the upper module housing 6 is snap-fitted to the lower module housing 5.

Likewise, in order to accurately fix the loudspeaker unit 4 on the lower module housing 5, in a preferred implementation of the embodiment I of the present invention, loudspeaker unit positioning structures 14 are provided on three sidewalls (excluding the sidewall provided with the sound outlet) of the lower module housing 5, and the loudspeaker unit 4 may be rapidly and effectively fixed on the lower module housing 5 through the loudspeaker unit positioning structures 14. The loudspeaker unit positioning structures 14 may be provided in the form of snap joints, projections or the like, and the loudspeaker unit positioning structures 14 may be integratedly formed with the lower module housing 5, or may be jointed with the lower module housing 5 after molding respectively.

Likewise, in order to accurately fix the loudspeaker module 3 on the cellphone housing 2, in another preferred implementation of the embodiment I of the present invention, loudspeaker module positioning structures 13 for fixing the loudspeaker module 3 are provided on the cellphone housing 2, and the loudspeaker module 3 may be rapidly and effectively fixed on the cellphone housing 2 through the loudspeaker module positioning structures 13. The loudspeaker module positioning structures 13 may be provided in the form of snap joints, projections or the like, and the loudspeaker module positioning structures 13 may be integratedly formed with the cellphone housing, or may be fixed on the cellphone housing 2 by adhesive or other methods after molding respectively.

During the assembly of the loudspeaker module 3 and the cellphone, the loudspeaker unit 4 is installed on the loudspeaker module 3 first, then the assembled loudspeaker module 3 is installed in the cellphone housing 2, and finally the cellphone back cover 1 is snap-fitted to the cellphone housing. In order to avoid the upper surface of the loudspeaker unit 4 bumping against the upper module housing 6, in another particular implementation of the present invention, a foam 15 is adhered above the loudspeaker unit 4. When the cellphone back cover 1 is snap-fitted to the cellphone housing 2, the foam 15 is press-fitted between the upper module housing 6 and the loudspeaker unit 4 to play a role of buffering and sealing for the loudspeaker unit 4. Certainly, the foam 15 may be directly adhered on the cellphone housing 2 at a position opposite to an assembly position of the loudspeaker unit 4, according to practical design and assembly requirements.

In the embodiment II of the present invention, an electric connecting part 9 is connected to a border position at one side of the loudspeaker module 3, so as to supply electric signals to the loudspeaker module 3 and drive the loudspeaker module 3 to produce sound. A groove is provided in a sidewall of the lower module housing 5, and the neck of the electric connecting part 9 penetrates through the sidewall of the lower module housing 5 through the groove, so that the distance from the loudspeaker module 3 to the bottom surface of the lower module housing 5 is decreased. Thus, even though the overall thickness of the module housing is increased due to the added upper module housing 6, the overall thickness of the cellphone is enabled to be constant.

It should be noted that, the center portion of the bottom of the lower module housing 5 of the loudspeaker module 3 is hollow, and an upward flange is provided at the border position of the hollow portion, so that the loudspeaker unit 4 cannot be adhered to the bottom of the lower module housing 5. A front acoustic cavity 10 is defined as a space formed between the bottom of the lower module housing 5 and the loudspeaker unit 4.

Figure 7:
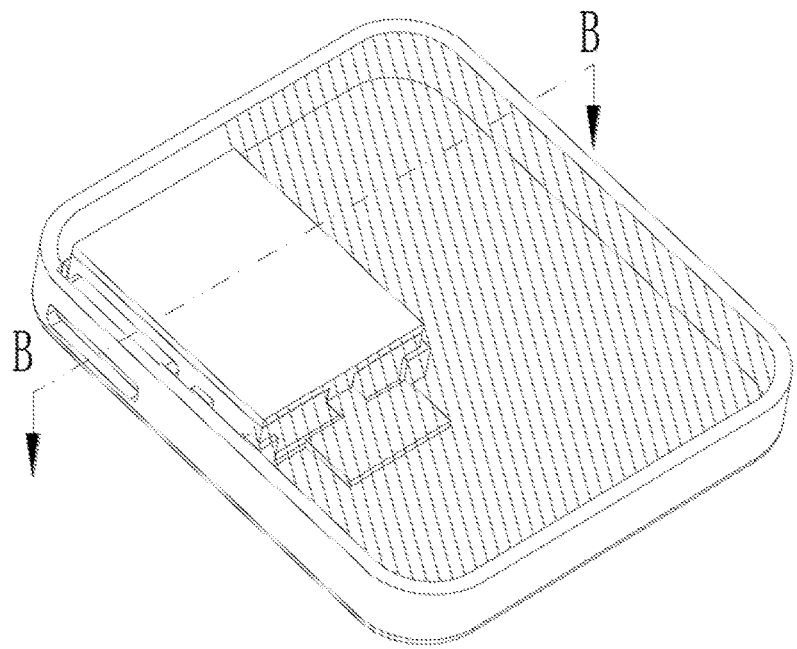
FIG. 7 is an assembly schematic diagram showing the loudspeaker module applied inside the terminal according to the embodiment II of the present invention.
Figure 8:
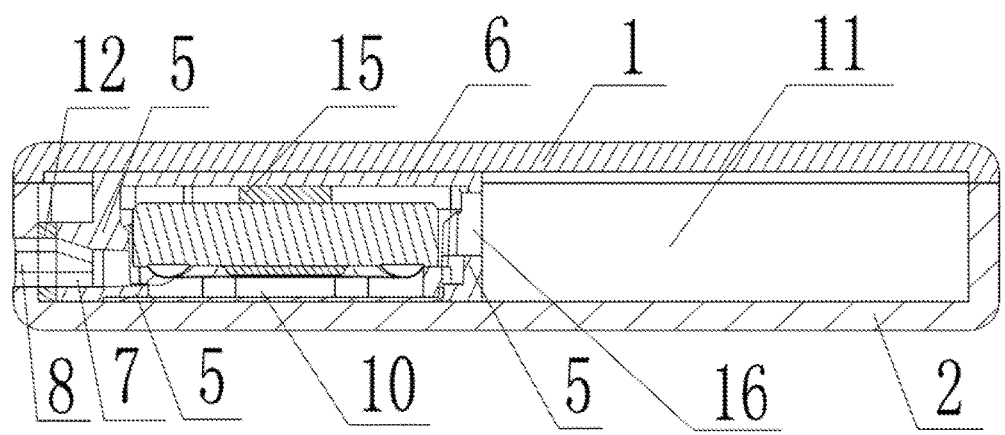
FIG. 8 is a section view taken along line B-B in FIG. 7.

FIG. 7 is an assembly schematic diagram showing the loudspeaker module applied inside the terminal according to the embodiment II of the present invention, and FIG. 8 is a section view taken along line B-B in FIG. 7.

As shown in FIG. 7 and FIG. 8, in order to illustrate the connection structure of the loudspeaker module and the cellphone more visually, FIG. 7 is an assembly schematic diagram in which the cellphone back cover 1 is not yet snap-fitted. As can be seen in connection with FIG. 8, a front acoustic cavity 10 is defined as a space formed by the loudspeaker unit 4 and the lower module housing, the front acoustic cavity 10 is in communication with the sound outlet 8 of the lower module housing 5, and a rear acoustic cavity 11 is defined as a space formed by the loudspeaker unit 4 and the upper module housing 6. The rear acoustic cavity 11 is in communication with the space inside the cellphone (a space formed inside the cellphone when the cellphone housing 2 is snap-fitted to the cellphone back cover 1) through the through hole 16. The dash area in FIG. 8 is included in the rear acoustic cavity 11, and other components inside the terminal are not illustrated.

As the rear acoustic cavity of the loudspeaker module 3 is required to be sealed, a sealing element 12 is provided at a position where the sound outlet 8 of the lower module housing 5 and the front acoustic cavity 10 are connected with each other, the sealing element 12 is entangled around the sound outlet 8 so as to seal the front acoustic cavity and the rear acoustic cavity, and separate the front acoustic cavity 10 and the rear acoustic cavity 11. The sealing element 12 may be a sealing elastic cushion, a rubber ring or other sealing device.

In the above embodiment II, another implementation of the loudspeaker module applied inside the terminal provided by the present invention is described in detail. As can be seen, since a through hole 16 is provided in the upper module housing 6, the space available in the cellphone is transformed into the rear acoustic cavity, and the space of the rear acoustic cavity is increased, thus, the acoustic performance of the loudspeaker module is improved; in addition, the assembly of the loudspeaker module and the terminal is simplified, and the production efficiency is improved.

In conclusion, by means of the loudspeaker module applied inside the terminal provided by the present invention, the usable space inside the terminal can be converted into the rear acoustic cavity, so that the space of the rear acoustic cavity is enlarged, and the acoustic performance of the loudspeaker module can be effectively improved. Therefore, the present invention makes full use of the interior space of the terminal to realize the thinning of the loudspeaker module and achieve good acoustic performance, without changing the interior space of the terminal.

As described above, the loudspeaker module applied inside the terminal provided by the present invention is described by way of example with reference to the accompanying drawings. However, it should be understood by those skilled in the art that various improvements on details achieved therein can be made to the loudspeaker module applied inside the terminal provided by the present invention as described above, without depart from the contents of the

The invention claimed is:

1. A terminal having a loudspeaker module, wherein the terminal comprises a terminal housing in which the loudspeaker module is fixedly mounted, and the loudspeaker module comprises a loudspeaker unit and a lower module housing for accommodating and fixing the loudspeaker unit, wherein:
   the terminal housing is provided with a sound hole, and the terminal housing is for accommodating the loudspeaker module; and
   a rear acoustic cavity is defined as a closed space jointly formed by the loudspeaker unit, an outer wall of the lower module housing and the terminal housing, and a front acoustic cavity is defined as a space formed by the loudspeaker unit and an inner wall of the lower module housing; and the front acoustic cavity is in communication with the sound hole,
   the sound hole is located at a lateral surface of the terminal housing, and a sidewall of the lower module housing is provided with a sound outlet in communication with the front acoustic cavity, and the sound outlet is fitted to the sound hole correspondingly,
   the sound outlet protrudes from a surface of the sidewall of the lower module housing,
   the sound outlet is fixed with the sound hole by being inserted into and connected with the sound hole, and
   the sound outlet is integrally molded with the lower module housing, or is jointed with the lower module housing after the sound outlet and the lower module housing are molded, respectively.

2. The terminal having a loudspeaker module according to claim 1, wherein
   a sealing element is provided at a position where the sound outlet of the lower module housing and the front acoustic cavity are connected with each other, and the sealing element is provided around the sound outlet; and the sealing element is a sealing elastic cushion or a rubber ring.

3. The terminal having a loudspeaker module according to claim 2, wherein
   the front acoustic cavity and the rear acoustic cavity are spaced apart by the lower module housing and the sealing element.

4. The terminal having a loudspeaker module according to claim 1, wherein
   the lower module housing has a groove-shaped structure, the lower module housing having the groove-shaped structure has an open end, side walls and a bottom, the open end is provided so as to correspond to the rear acoustic cavity, the side walls are for accommodating the loudspeaker unit, and the bottom is provided so as to correspond to the front acoustic cavity.

5. The terminal having a loudspeaker module according to claim 4, wherein
   a hollow structure is provided at a central portion of the bottom, and an annular flange is formed at a position where the bottom is connected with the side walls, the loudspeaker unit and the terminal housing are provided to be spaced apart from each other by the flange, the front acoustic cavity is jointly formed by the loudspeaker unit, the flange and the terminal housing; and
   a sound generated by the loudspeaker unit passes through the front acoustic cavity, the sound outlet and the sound hole in sequence so as to be radiated to the outside.

6. The terminal having a loudspeaker module according to claim 1, wherein the terminal housing is provided with loudspeaker module positioning structures for positioning the loudspeaker module, the lower module housing has a rectangular structure, and the loudspeaker module positioning structures are provided at four corners of the lower module housing;
   the loudspeaker module positioning structures are snap joints or projections; and
   the loudspeaker module positioning structures are integrally molded with the terminal housing, or are fixed with the terminal housing by an adhesive after the loudspeaker module positioning structures and the terminal housing are molded respectively.

7. The terminal having a loudspeaker module according to claim 1, wherein
   loudspeaker unit positioning structures for positioning the loudspeaker unit are provided on the lower module housing;
   the loudspeaker unit positioning structures are provided on three sidewalls of the lower module housing; and
   the loudspeaker unit positioning structures are snap joints or projections, and the loudspeaker unit positioning structures are integrally molded with the lower module housing or assembled with the lower module housing after the loudspeaker unit positioning structures and the lower module housing are molded respectively.

8. The terminal having a loudspeaker module according to claim 1, wherein
   the loudspeaker unit is provided with a foam at one side of the loudspeaker unit away from the front acoustic cavity.

9. A terminal having a loudspeaker module, wherein the terminal comprises a terminal housing in which the loudspeaker module is fixedly mounted, and the loudspeaker module comprises a loudspeaker unit and a module housing for accommodating and fixing the loudspeaker unit, wherein:
   the terminal housing is provided with a sound hole;
   the module housing comprises an upper module housing and a lower module housing, an open front acoustic cavity is jointly formed by the loudspeaker unit and the lower module housing, and an open rear acoustic cavity is jointly formed by the loudspeaker unit, the upper module housing and the lower module housing; and
   the terminal housing is for accommodating the loudspeaker module and cooperates with the loudspeaker module to form a rear acoustic cavity and a front acoustic cavity; and the rear acoustic cavity has a closed structure, and the front acoustic cavity is in communication with the sound hole,
   the sound hole is located at a lateral surface of the terminal housing, and a sidewall of the lower module housing is provided with a sound outlet, and the sound outlet is fitted to the sound hole correspondingly,
   a sound generated by the loudspeaker unit passes through the front acoustic cavity, the sound outlet and the sound hole in sequence so as to be radiated to the outside,
   the sound outlet protrudes from a surface of the sidewall of the lower module housing,
   the sound outlet is fixed with the sound hole by being inserted into and connected with the sound hole, and
   the sound outlet is integrally molded with the lower module housing, or is jointed with the lower module housing after the sound outlet and the lower module housing are molded, respectively.

10. The terminal having a loudspeaker module according to claim 9, wherein the upper module housing has a flat-shaped structure, and the lower module housing has a groove-shaped structure, a side wall of the lower module housing is provided with a through hole for communicating the open rear acoustic cavity with a space inside the terminal housing, and the rear acoustic cavity is jointly formed by the open rear acoustic cavity and the space inside the terminal housing communicated with the open rear acoustic cavity through the through hole.

11. The terminal having a loudspeaker module according to claim 10, wherein a height of the loudspeaker module is the same with a height of the space inside the terminal housing; and the loudspeaker module is in communication with the space inside the terminal housing from a lateral side of the loudspeaker module through the through hole, and is only in communication with the space inside the terminal housing located at the lateral side of the loudspeaker module.

12. The terminal having a loudspeaker module according to claim 9, wherein the lower module housing has a groove-shaped structure, the lower module housing having the groove-shaped structure has an open end, side walls and a bottom, the open end is provided so as to correspond to the rear acoustic cavity, the side walls is for accommodating the loudspeaker unit, and the bottom is provided so as to correspond to the front acoustic cavity;

a hollow structure is provided at a central portion of the bottom, and an annular flange is formed at a position where the bottom is connected with the side walls, the loudspeaker unit and the terminal housing are provided to be spaced apart from each other by the flange, and the front acoustic cavity is jointly formed by the loudspeaker unit, the flange and the terminal housing.

13. The terminal having a loudspeaker module according to claim 9, wherein a sealing element is provided at a position where the sound outlet of the lower module housing and the front acoustic cavity are connected with each other, and the sealing element is provided around the sound outlet; and the sealing element is a sealing elastic cushion or a rubber ring.

14. The terminal having a loudspeaker module according to claim 13, wherein the front acoustic cavity and the rear acoustic cavity are spaced apart by the lower module housing and the sealing element.

15. The terminal having a loudspeaker module according to claim 9, wherein the terminal housing is provided with loudspeaker module positioning structures for positioning the loudspeaker module, the lower module housing has a rectangular structure, and the loudspeaker module positioning structures are provided at four corners of the lower module housing;

the loudspeaker module positioning structures are snap joints or projections; and the loudspeaker module positioning structures are integrally molded with the terminal housing, or are fixed with the terminal housing by an adhesive after the loudspeaker module positioning structures and the terminal housing are molded respectively.

16. The terminal having a loudspeaker module according to claim 9, wherein loudspeaker unit positioning structures for positioning the loudspeaker unit are provided on the lower module housing;

the loudspeaker unit positioning structures are provided on three sidewalls of the lower module housing; and the loudspeaker unit positioning structures are snap joints or projections, and the loudspeaker unit positioning structures are integrally molded with the lower module housing or assembled with the lower module housing after the loudspeaker unit positioning structures and the lower module housing are molded respectively.

* * * * *